United States Patent [19]

Cremer et al.

[11] Patent Number: 4,749,231
[45] Date of Patent: Jun. 7, 1988

[54] BACK REST FOR A VEHICLE SEAT

[75] Inventors: Heinz P. Cremer, Kaiserslautern; Gunter Franzmann, Rockenhausen; Dieter Braun; Elmar Deegener, both of Kaiserslautern; Hans-Helmut Ernst, Sulfeld, all of Fed. Rep. of Germany

[73] Assignee: Keiper Recaro GmbH & Co., Fed. Rep. of Germany

[21] Appl. No.: 114,024

[22] Filed: Oct. 29, 1987

[30] Foreign Application Priority Data

Oct. 30, 1986 [DE] Fed. Rep. of Germany ....... 3636912

[51] Int. Cl.$^4$ .............................................. A62B 35/00
[52] U.S. Cl. .................................... 297/468; 297/475; 297/483
[58] Field of Search ............... 297/468, 475, 474, 483, 297/452, 476, 477, 478

[56] References Cited

U.S. PATENT DOCUMENTS

| | | | |
|---|---|---|---|
| 3,663,057 | 5/1972 | Lohr et al. | 297/475 |
| 3,877,748 | 4/1975 | Eggert | 297/483 |
| 4,037,873 | 7/1977 | Weman | 297/475 |
| 4,585,273 | 4/1986 | Higgs et al. | 297/468 |
| 4,621,836 | 11/1986 | Mori et al. | 297/475 |

Primary Examiner—Francis K. Zugel
Attorney, Agent, or Firm—Wigman & Cohen

[57] ABSTRACT

In a back rest for a vehicle seat, the upholstery support is provided at least in one upper corner area in its front side with an opening to form a receptacle for a belt retraction device, which receptacle is open toward the front and closed at the rear by a back wall lying behind and spaced from the front side. An upper and a lower wall, which form the top and bottom of the receptacle, are connected with the front wall and/or the back wall and are spaced from each other so as to allow the receptacle to receive the belt retraction device without play. Form-fitting, overlapping restraining elements on the upper wall and the facing upper side of the belt retraction device, as well as on the back wall and the facing back side of the belt retraction device, together with a connecting element that engages the underside of the belt retraction device, secure the retraction device against being moved out of the receptacle.

12 Claims, 4 Drawing Sheets

Fig.3
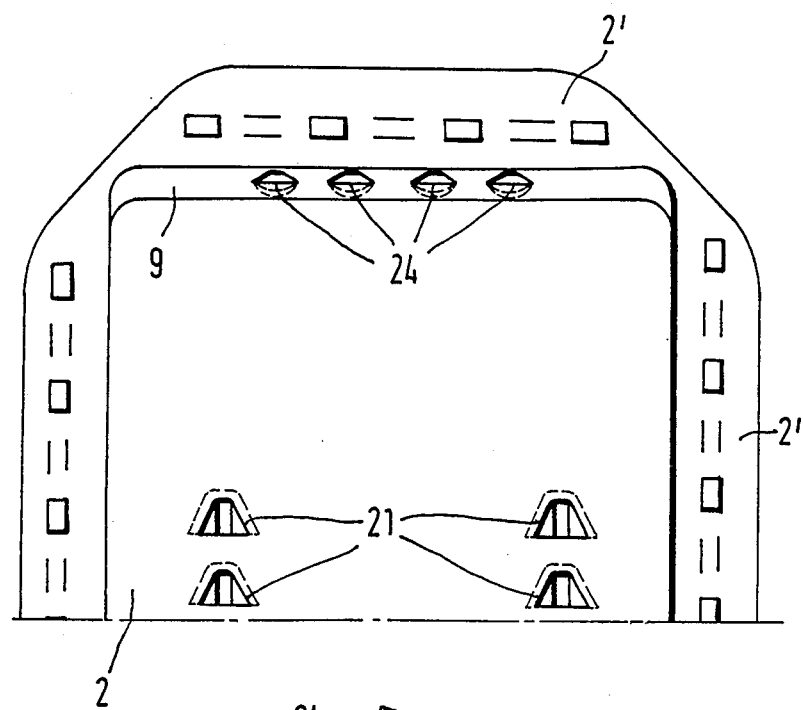
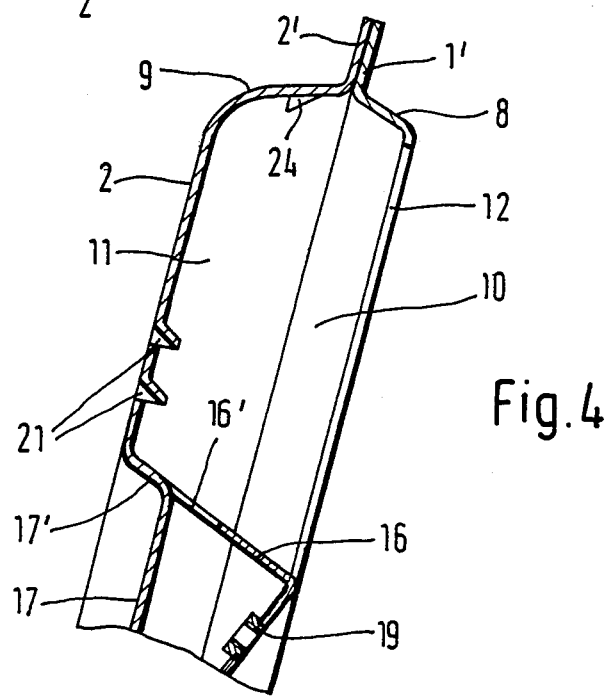
Fig.4

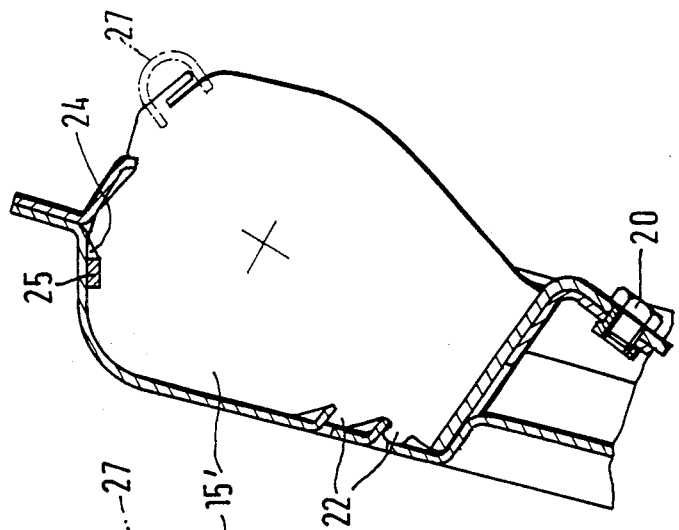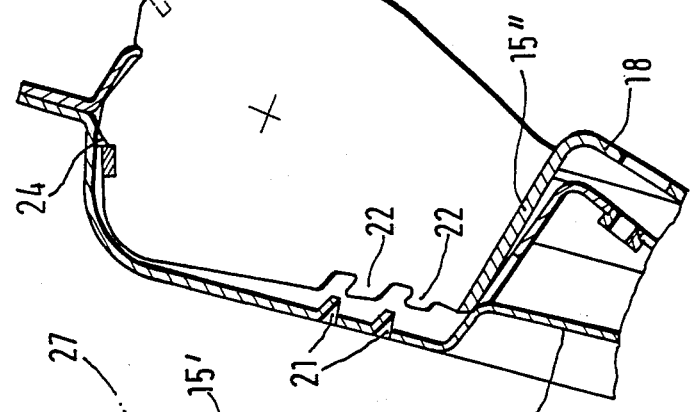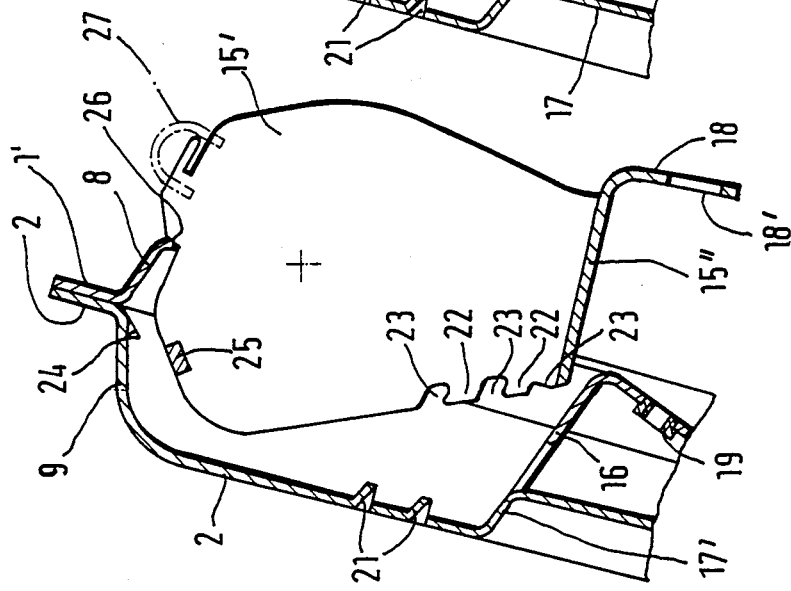

BACK REST FOR A VEHICLE SEAT

BACKGROUND OF THE INVENTION

The present invention relates to a back rest for a vehicle seat, particularly a motor vehicle seat, the upholstery support of which includes a back wall and side walls at least in its upper corner areas.

Generally speaking with motor vehicle seats, the seat belt of a three-point safety belt passes through the buckle and its free end of the lap belt portion is connected with the vehicle seat. The shoulder strap portion, in contrast, leads to a pillar or other point on the vehicle body. This is also the case with a seat having a known back rest of the above-described type (DE-PS No. 35 21 402), although the upholstery support of this known back rest has a very high loading capacity.

SUMMARY AND OBJECTS OF THE INVENTION

In view of the foregoing limitations and shortcomings of the prior art devices, as well as other disadvantages not specifically mentioned above, a primary object of the invention is to create a back rest in which a belt retraction device of a safety belt can be attached to the upholstery support in the simplest possible manner and with the requisite load carrying capacity.

Beginning with a back rest of the above-described type, this object is achieved according to the invention by providing an opening provided in the front side of the upholstery support to form a receptacle for a belt retraction device, which receptacle is open towards the front and bounded at the rear by the back wall of the upholstery support. An upper and lower wall formed in the upholstery support delimit the receptacle and are connected to the front and/or back wall and hold the belt retraction device without play. Restraining and connecting elements hold the belt retraction device in the receptacle.

According to the invention, the embodiment of the receptacle for the belt retraction device results in an extremely simple mounting, because the belt retraction device need only be inserted through the opening into the receptacle with a pivoting movement about a contact point on the upper edge of the opening, and then secured in place by means of the connection element. The force exerted by the seat belt on the belt retraction device when in the blocking position is not borne by individual connection elements, but is finally distributed over a large surface area or at least over a plurality of contact points between the belt retraction device and the upholstery support. A tensile loading of the seat belt, namely due to the torque exerted thereby on the belt retraction device, results in the belt retraction device being braced between the upper and lower walls of the receptacle. In addition there is the restraining force of the holding elements. In case of an accident, the belt retraction device is thus held securely in the receptacle. The connection element is not loaded thereby and can therefore be made in the form of a relatively weak screw or the like.

Aside from the simple from-the-front mounting of the belt retraction device and the avoidance of a point-focused force introduction into the sheet metal structure of the upholstery support, the solution according to the invention also has a series of additional advantages. The belt retraction device can be integrated optimally into the back rest structure without play or rattling. In addition, the arrangement of the belt retraction device in the upholstery support results in there being fewer belt diversion points, so that a smaller belt retraction force will suffice, thus increasing wearer comfort.

In addition, it is not necessary to provide an extra length of seat belt to accommodate a longitudinal adjustment of the seat, so that a smaller belt coil is sufficient, which substantially reduces or entirely eliminates the disruptive film spool effect. Furthermore, the exit angle of the seat belt can be predetermined in a simple manner by means of an integrated diverter. If the back rest has a limited force tolerance, the loading to be assumed by the belt retraction device can be reduced, which results in smaller material thicknesses for the retraction device and makes it possible to manufacture the housing of the belt retraction device from simpler or lighter weight material. An additional, significant advantage of the arrangement of the belt retraction device in the receptacle of the upholstery support according to the invention is that the safety belt is fully functional in all reclining positions.

Advantageously, the depth of the recess is smaller than the dimension of the belt retraction device measured in this same direction, so that the belt can be comfortably grasped by the seat user.

By adapting the contour of the opening to the outside contour of the belt retraction device, the opening is capable of also positioning the belt retraction device in the direction of its rotational axis.

Because a high load is placed on the upper wall of the receptacle when the belt is heavily loaded, the upper wall is formed by curved elements in the front wall and the back wall, which here, for purposes of the invention, are directly connected with each other.

In order to further simplify the placement of the belt retraction device into the receptacle and to avoid play in the belt retraction device between the upper and lower walls, the lower wall is formed in one preferred embodiment as a sloping plane. Particularly advantageous hereby is an embodiment in which the lower wall is formed at least in part by a resilient tongue which is formed from a portion of the front wall and is bent toward the back wall, because a resilient tongue, which can be formed from the material to be removed to form the opening, assures that the belt retraction device will abut against the upper wall, even with large tolerances. If a resilient tongue is provided, it is advantageous to form a portion of the lower wall as a reinforcing crease.

Restraining elements provided on the back wall and the upper wall and formed from sections of material that are pressed out of these walls and are roof-shaped in cross-section are particularly advantageous, because they are capable of bearing large forces, and because they are also economical to manufacture, namely in the shaping of the back wall.

It is preferred for the belt retraction to have a U-shaped roll housing provided with openings to form teeth which engage beneath the associated holding elements in the back wall. Teeth of this type are also very economical to manufacture and provide a connection with a high load bearing capacity.

The belt retraction device advantageously includes a bar to cooperate with the holding elements provided on the upper wall. A bar of this type makes it possible to be able to provide holding elements on the upper wall also in the area between the shanks of the roll housing and to bring them into engagement with the bar, so that a very high restraining force can be achieved.

To simplify mounting, both shanks of the roll housing can be provided with a step that is adjacent to the upper end of the opening.

In the interest of making the mounting process as simple as possible, in one preferred embodiment the yoke section of the belt retraction device housing has a strap that is bent opposite to the direction in which the shanks extend and is provided with a hole to allow for the passage of a screw which engages a nut that is connected to the front wall. The retraction device then need only be introduced into the receptacle until the strap contacts the front wall. Then, the strap need only be connected with the front wall by means of a screw or the like, by which means movement of the belt retraction device in the receptacle, which could result in rattling, can simultaneously be avoided.

With the foregoing and other objects, advantages and features of the invention that will become apparent hereinafter, the nature of the invention may be more clearly understood by reference to the following detailed description of the views, the appended claims and to the several views illustrated in the attached drawings.

BRIEF DESCRIPTION OF THE DRAWINGS

FIG. 3 is a partially illustrated top view of the inside of the back wall of the upholstery support which forms the back shell;

FIG. 4 is a longitudinal section through the receptacle for the belt retraction device;

FIG. 5 is a section according to FIG. 4 with a schematically illustrated side view of the retraction device housing at the beginning of the insertion process;

FIG. 6 is a longitudinal section of the receptacle and a side view of the retraction device housing in a position of the latter shortly before the end of the insertion process; and FIG. 7 is a longitudinal section of the receptacle and a side view of the retraction device housing in a completely installed condition.

DETAILED DESCRIPTION OF A PREFERRED EMBODIMENT

Figure 1:
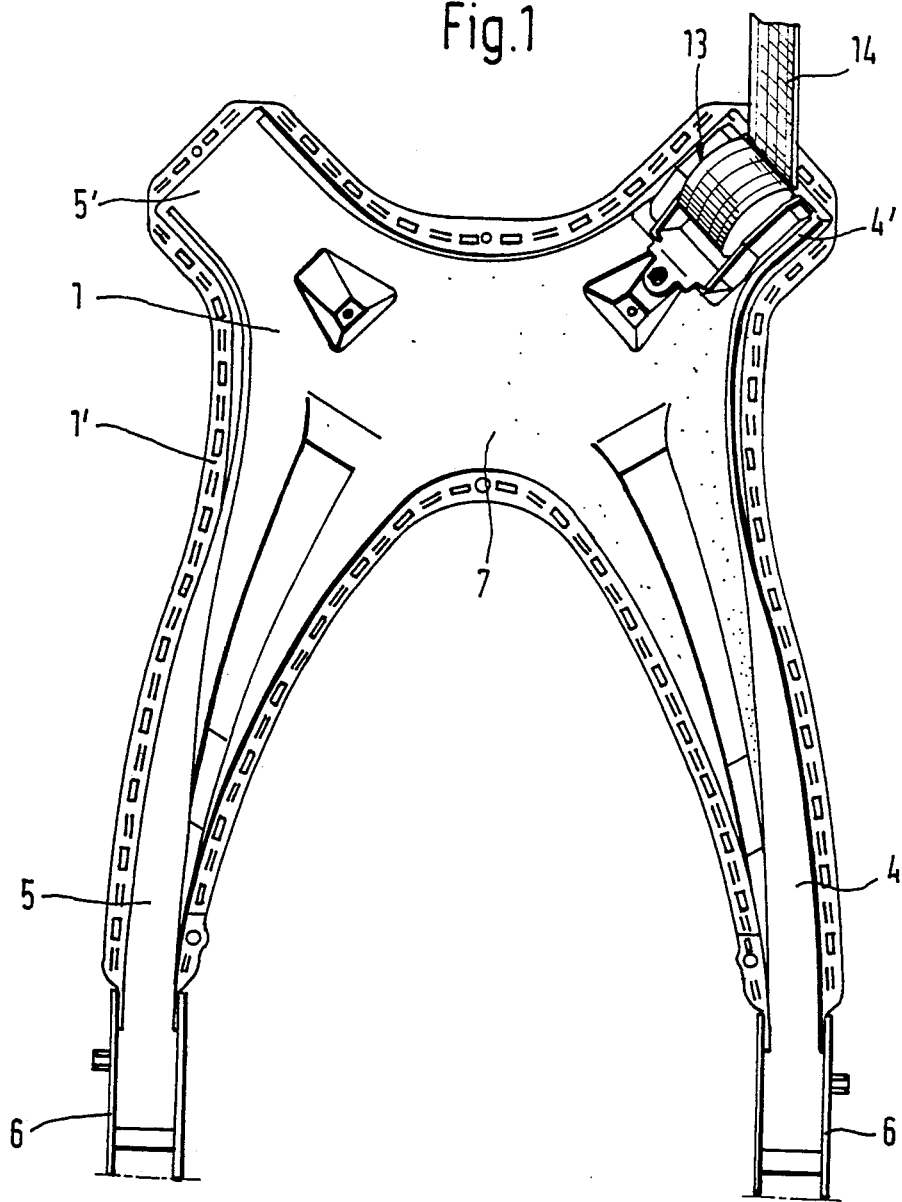
FIG. 1 is a front view of the upholstery support with an integrated belt retraction device.
Figure 2:
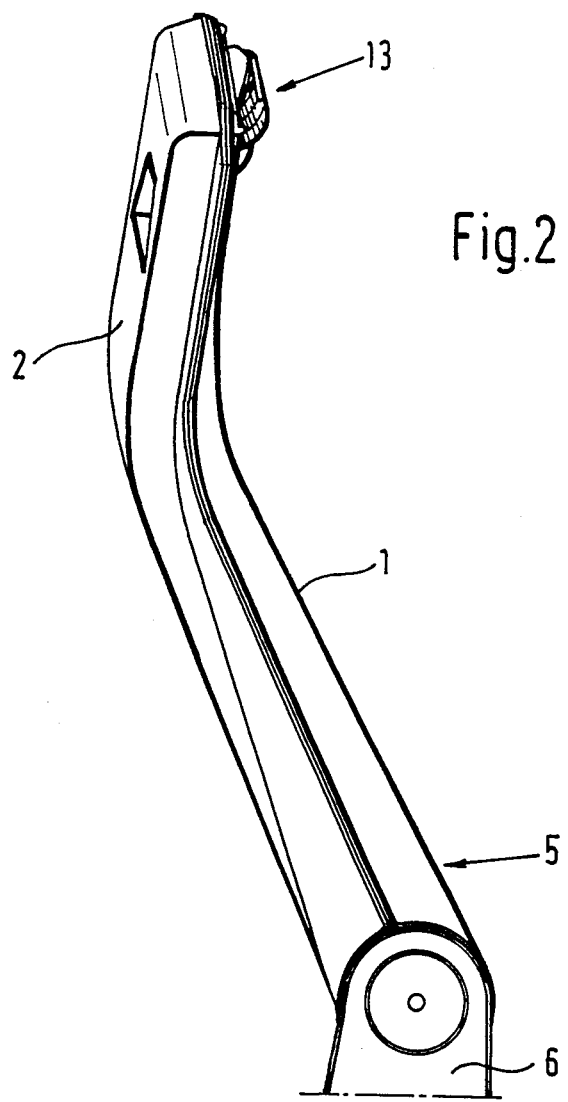
FIG. 2 is a side view of the upholstery support with an integrated belt retraction device.

Referring now in detail to the drawings wherein like parts are designated by like reference numerals throughout, there is illustrated in FIGS. 1 and 2 a back rest for a motor vehicle seat having an upholstery support comprised of a front sheet metal shell 1 and a rear sheet metal shell 2, which upholstery support has the shape illustrated in FIG. 1. The two sheet metal shells 1 and 2 have flange-like bent edge zones 1' and 2' that abut each other, are connected with each other in this zone and form two hollow longitudinal beams 4 and 5, the lower ends of which are connected with respective hinge fittings 6. As shown in FIG. 1, the two longitudinal beams 4 and 5 approach each other steplessly from the bottom until about the center of the upper half, and then extend upwardly and outwardly. A hollow central portion 7 which is also formed by the two sheet metal shells 1 and 2 connects the two longitudinal beams 4 and 5 with each other in the area of their upper halves. The two upper end sections 4' and 5' of the longitudinal beams 4, 5, which extend at an angle upwardly and toward the side, project above the central portion 7.

Relative to the upper end section 4', as shown in FIG. 4, both end sections are bounded at the top by an upper wall, which is formed by a backwardly bent portion 8 of the front sheet metal shell 1 serving as the front wall of the upholstery support and by a forwardly bent portion 9 of the sheet metal shell 2 serving as the back wall. Accordingly, the two upper end sections 4' and 5' are bounded laterally by a backwardly bent portion 10 of the front sheet metal shell 1 and a forwardly bent portion 11 of the rear sheet metal shell 2.

In the area of the upper end section 4', the front sheet metal shell 1 is provided with a rectangular opening 12, which extends over the entire width of the upper end section 4' and on to the upper wall formed by the portions 8 and 9. This opening 12 forms the access to a receptacle formed by the upper end section 4' for a seat retraction device designated generally by the reference numeral 13, which is to be mounted in the receptacle in order to transfer the forces exerted on it by its seat belt 14 into the upholstery support.

The belt retraction device 13 includes a known and therefore unillustrated take-up shaft which is rotatably mounted in a U-shaped take-up spool housing 15, which in the exemplary embodiment is made of aluminum sheet. An encapsulated return take-up spring is arranged adjacent to the outside of one shank 15' of this take-up spool housing 15, and the blocking device, also encapsulated, is arranged adjacent to the outside of the other shank 15'. This blocking device can be formed in a known manner. In the exemplary embodiment a release is accomplished by means of a stroke magnet in conjunction with an acceleration absorbing device.

As shown in FIG. 1, the width of the opening 12 and the receptacle are adaped to the width of the belt retraction device 13, so that this device 13 is arranged in the receptacle without any signficant lateral play. As shown in FIGS. 2 and 7, in contrast, the depth of the receptacle is smaller than the dimension of the belt retraction device 13 measured in the same direction, so that this device 13 projects forward beyond the front sheet metal shell 1.

In the downward direction the receptacle is bounded by a lower wall, which is formed in part by a tongue 16, which itself is formed in one place with the front sheet metal shell 1 and, at the lower edge of the opening 12, is bent toward the back sheet metal shell 2. The tongue 16 is made from a portion of the same material that had to be removed from the front sheet metal shell 1 to form the opening 12. As may be seen especially in FIG. 4, the tongue 16 forms an inclined plane, namely in such a manner as to form an acute angle with the plane defined by the opening 12 and an obtuse angle with the surface of the back sheet metal shell 2 defining the rear of the receptacle.

In the free end of the somewhat resilient tongue 16 ending near the back sheet metal shell 2, there is provided a central opening 16', into which a reinforcing crease 17 of the rear sheet metal shell 2 projects. The upwardly facing outer wall 17' of the back sheet metal shell 2 lies in the plane defined by the tongue 16 and forms a portion of the lower wall defining the receptacle. As shown in FIG. 7, the yoke section 15" of the take-up spool housing 15 rests on this lower wall. The distance of the lower wall from the upper wall formed by the elements 8 and 9 is selected in such a manner that, when mounted, the upper edges of the two shanks 15' of the take-up spool housing 15 lying inside the receptacle directly contact the upper wall with no play, whereby the amount of resilience of the tongue 16 compensates for manufacturing tolerances.

A strap 18, which projects slightly forward from the yoke section 15″ and then curves downward, is formed in one piece with the yoke section 15″ of the take-up spool housing 15. Strap 18 is provided with a longitudinal hole 18′ which aligns with a nut 19 when the belt retraction device 13 is in its mounted position. This nut 19 is rigidly connected with the front sheet metal shell 1 in the area of a depression in which the strap 18 engages. After the belt retraction device 13 is set in place, a screw 20 secures it in the correct position, but assumes no part of any tensile load on the seat belt 14.

As shown in FIGS. 3 and 4, holding elements 21 pressed out from the back sheet metal shell 2 project into the receptacle, have a roof-like cross-sectional profile and are downwardly open. The arrangement of these holding elements 21 is selected such that two of them are aligned with each of the two shanks 15′ of the take-up spool housing 15 and are spaced from each other in the longitudinal direction of the shanks. When the belt retraction device 13 is mounted, each tooth 22 of the shanks 15′ grips beneath the holding elements 21. The teeth 22 provided on the rear edge of the shanks 15′ are exposed by means of openings 23.

Holding elements 24 formed in the same manner as the holding elements 21 project out of the element 9 of the rear sheet metal shell 2 into the receptacle. As shown in FIG. 3, these holding elements 24 lie adjacent to and spaced from one another between the two contact surfaces for the shanks 15′. When the belt retraction device 13 is in its mounted position, a bar 25 which is rectangular in cross-section extends behind these holding elements 24, the end sections of which bar 25 are placed into correspondingly shaped openings in the upper edge of the two shanks 15′ and are secured there in place.

As a mounting aid the upper edge of each of the two shanks 15′ of the take-up spool housing 15 is also provided with a step 26. These steps 26, as shown in FIG. 5 are brought into contact with the upper limiting edge of the opening 12 at the beginning of the mounting process. The insertion of the belt retraction device 13 into the receptacle then takes place in such a manner that the entire belt retraction device 13 is pivoted about the axis defined by the step 26. As this is done, first the bar 25 engages behind the holding elements 24. Shortly before the rear edge of the shank 15′ comes into contact against the rear wall of the receptacle, the teeth 22 engage beneath the holding elements 21. At the end of the insertion process the shanks 15′ abut the rear and upper boundary walls of the receptacle. In addition, the yoke section 15″ rests on the boundary wall 17′ on the tongue 16. Finally, the strap 18 rests against the front sheet metal shell 1, as shown in FIG. 7. The seat belt 14, which because of the mounting of the belt retraction device 13 from the front does not need to be threaded through any type of slot, can be diverted to the necessary degree by a guide element 27 secured to the take-up spool housing 15.

If the seat belt 14 exerts a tensile force on the belt retraction device 13 when the blocking effect is active, then a torque acting in the sense of a clock-wise pivot movement as viewed according to FIGS. 5 through 7 acts on the take-up spool housing 15 about the front edge of the yoke section 15″ to which the strap 18 is connected. This torque has the result that the shanks 15′ are pressed against the upper wall of the receptacle formed by the elements 8 and 9 with increased force. In addition to this tensioning, the holding elements 21 and 24 together with the teeth 22 and the bar 25 of the take-up spool housing 15, also serve to prevent a movement out of the position illustrated in FIG. 7. The screw 20 thereby is not subjected to a load and therefore can be of smaller dimensions.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A back rest for a vehicle seat forming an upholstery support, particularly a motor vehicle seat, the upholstery support of which has a front side, a back wall, and side walls at least in an upper corner area, comprising:
   (a) an opening provided in the front side to form a receptacle for a belt retraction device, which receptacle is open towards the front and bounded at the rear by the back wall, which lies behind and spaced from the front side;
   (b) an upper and a lower wall formed in said upholstery support to delimit the top and bottom of the receptacle, which upper and lower walls are connected with one of the front wall, the back wall, and both the front and back wall, and are spaced from each other sufficiently to allow the belt retraction device to be held therein without play;
   (c) form-fitting, overlapping restraining elements on the upper wall and the facing upper side of the belt retraction device, as well as on the back wall and the facing back side of the belt retraction device; and
   (d) a connecting element which secures the underside of the belt retraction device against moving out of the receptacle.

2. The back rest according to claim 1, wherein the depth of the receptacle is smaller than the dimension of the belt retraction device measured in the same direction.

3. The back rest according to claim 1, wherein the shape of the opening is adapted to the outside contour of the belt retraction device.

4. The back rest according to claim 1, wherein the upper wall is formed by a rearwardly bent portion of the front wall and by a forwardly bent portion of the back wall.

5. The back rest according to claim 1, wherein the lower wall forms an inclined step, the distance of which from the upper walls becomes smaller as it approaches the back wall.

6. The back rest according to claim 1, wherein the lower wall is formed at least in part by a resilient tongue which is formed from a portion of the front wall and is bent toward the back wall.

7. The back rest according to claim 6, wherein the back wall is provided with a reinforcing crease, the surface of which facing the upper wall forms a portion of the lower wall adjacent to the tongue.

8. The back rest according to claim 1, wherein restraining elements provided on the back wall and the upper wall are formed from sections of material that are pressed out of these walls and are roof-shaped in cross-section.

9. The back rest according to claim 8, wherein the seat belt of the belt retraction device is arranged between two shanks of a U-shaped take-up device housing and the rear edges of two shanks are provided with openings to form teeth which engage beneath the associated, roof-shaped sections of material on the back wall.

10. The back rest according to claim 8, wherein a bar which is placed in openings in the edges of the two shanks of the take-up spool housing, extends from one shank to the other, and engages behind the roof-shaped sections of material provided on the upper wall.

11. The back rest according to claim 9, wherein the edges of the two shanks of the take-up spool housing that face the upper wall, are each provided with a step that is adjacent to the upper edge of the opening.

12. The back rest according to claim 9, wherein a yoke section provided in the take-up spool housing has on its front side a strap that is bent opposite to the direction in which the shanks extend, and is provided with a hole to allow for the passage of a screw which engages in a nut that is connected to the front wall.

* * * * *